US009953297B2

(12) United States Patent
Zhang et al.

(10) Patent No.: US 9,953,297 B2
(45) Date of Patent: Apr. 24, 2018

(54) SHARING ONLINE WITH GRANULARITY

(71) Applicants: Xincheng Zhang, Sunnyvale, CA (US); Jia Liu, Sunnyvale, CA (US)

(72) Inventors: Xincheng Zhang, Sunnyvale, CA (US); Jia Liu, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 13/653,796

(22) Filed: Oct. 17, 2012

(65) Prior Publication Data
US 2014/0108500 A1    Apr. 17, 2014

(51) Int. Cl.
G06F 15/16 (2006.01)
G06Q 10/10 (2012.01)

(52) U.S. Cl.
CPC ................... G06Q 10/101 (2013.01)

(58) Field of Classification Search
CPC ............... H04L 29/08072; H04L 29/06; H04L 29/0809; H04L 51/32; H04L 51/34; H04L 51/26; H04L 51/14; H04L 12/588; H04L 12/5885; H04L 12/5855; G06Q 50/01
See application file for complete search history.

(56) References Cited

U.S. PATENT DOCUMENTS

| 8,893,030 B1* | 11/2014 | Anderson | G06F 3/0483 715/764 |
| 2006/0117365 A1* | 6/2006 | Ueda | G11B 27/031 725/112 |
| 2006/0282819 A1* | 12/2006 | Graham | G06F 17/241 717/113 |
| 2009/0234876 A1 | 9/2009 | Schigel et al. | |
| 2011/0091187 A1* | 4/2011 | Duffin | G11B 27/322 386/343 |
| 2011/0219307 A1 | 9/2011 | Mate et al. | |
| 2011/0246502 A1* | 10/2011 | Aguera y Arcas | G06F 17/30023 707/769 |
| 2012/0023447 A1 | 1/2012 | Hoshino et al. | |

(Continued)

FOREIGN PATENT DOCUMENTS

CN  101523369 A  9/2009
CN  102346759 A  2/2012

(Continued)

OTHER PUBLICATIONS

International Search Report and Written Opinion for PCT/US2013/064853, dated Jan. 29, 2014, 15 pgs.

(Continued)

*Primary Examiner* — Suraj Joshi
*Assistant Examiner* — Jaren M Means
(74) *Attorney, Agent, or Firm* — Procopio, Cory, Hargreaves & Savitch LLP

(57) ABSTRACT

Sharing online with granularity is described, including providing content for presenting to a user; receiving input from the user indicating identification of a portion of the content; associating with another user a notice of availability of the content; receiving a request from the another user, the request identifies the content; and providing the content for presenting to the another user, such that at least a part of the portion of the content is positioned for presenting without navigation input from the another user.

19 Claims, 13 Drawing Sheets

(56) References Cited

U.S. PATENT DOCUMENTS

| | | | |
|---|---|---|---|
| 2012/0110474 A1* | 5/2012 | Chen | G06Q 10/10 |
| | | | 715/753 |
| 2012/0151383 A1 | 6/2012 | Kazan et al. | |
| 2012/0198334 A1 | 8/2012 | Surin et al. | |
| 2012/0209902 A1 | 8/2012 | Outerbridge | |
| 2013/0145269 A1* | 6/2013 | Latulipe | G06F 3/048 |
| | | | 715/720 |
| 2013/0339857 A1* | 12/2013 | Garcia Bailo | G06F 3/0484 |
| | | | 715/723 |

FOREIGN PATENT DOCUMENTS

| | | |
|---|---|---|
| CN | 102447715 A | 5/2012 |
| WO | 2008/024723 A2 | 2/2008 |
| WO | WO 2008024723 A2 * 2/2008 | ............. G06Q 30/02 |

OTHER PUBLICATIONS

European Search Report, dated Mar. 11, 2016, for related EP13847259.2, 9 pages.
Office Action for Chinese Patent Application No. 2013-800-545806 dated Jul. 13, 2017. English translation provided.

* cited by examiner

*Declaration of Independence*

IN CONGRESS, July 4, 1776. ⌒110

The unanimous Declaration of the thirteen united States of America,

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

⌒112

130  In CONGRESS. July 4, 1776.

*The unanimous Declaration of the thirteen united States of America.*

*The History Behind the*  *Declaration of*
150 *Independence*

[ Share ▶ ]⌒170        190⌒[ Sign Out ]

200A

*Declaration of Independence*

IN CONGRESS, July 4, 1776.  ⟵ 110

The unanimous Declaration of the thirteen united States of America,

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

⟵ 112

130 IN CONGRESS, July 4, 1776.

*The unanimous Declaration of the thirteen united States of America.*

*The History Behind the Declaration of Independence*

150

- Highlight Text ⟵ 280
- Highlight Image ⟵ 281
- Identify A/V Segment ⟵ 282
- Enter Recipient(s) ⟵ 285
- [Post] [Cancel] ⟵ 288

170 — [Share ▶]    190 — [Sign Out]

⟵ 275

200B

Declaration of Independence

IN CONGRESS, July 4, 1776. ⌐110

The unanimous Declaration of the thirteen united States of America,

⌐216
☐When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation. ⌐218
⌐217
☑We hold these truths to be self-evident, that all men are created equal, that they are endowed by their Creator with certain unalienable Rights, that among these are Life, Liberty and the pursuit of Happiness.—That to secure these rights, Governments are instituted among Men, deriving their just powers from the consent of the
216 ed☐—That whenever any Form of Government becomes destructive of these ends, it is the 216 of the
to alter or to abolish it, and to institute new Government, laying its foundation on such prin       and
organizing it 216 ers in such form, as to them shall seem most likely to effect their Safety and Happiness.
☐Prudence, it      will dictate that Governments long established should not be changed for light and transient causes; and accordingly all experience hath shewn, that mankind are more disposed to suffer, while evils are
216 able, than to right themselves by ⌐112
hing the forms to which they are
accustomed☐ But when a long train of abuses 130   IN CONGRESS. July 4, 1776.
and usurpations pursuing invariably the
same Object 216 s a design to reduce    The unanimous Declaration ... States of America.
them under a      e Despotism, it is their
right, it is their duty, to throw off such
Government, and to provide new Guards for                    214
their future security.—Such has been the
patient sufferance of these Colonies; and              Please select text
such is now the ne 216 hich constrains                you would want
them to alter their for    ystems of                  to highlight for the
Governme☐ The history of the present King            recepient(s). ⌐215
of Great Britain is a history of repeated
injuries and u 216 ions, all ha     n direct      ⌐220
object the est      ment of an 216 ute           ┌──────┐ ┌──────┐
Tyranny over these States To prove this, let     │ Done │ │Cancel│
Facts be submitted to a candid world.            └──────┘ └──────┘

*The History Behind the*
*Declaration of*
150 *Independence*

170 ⌐(Share ▶)            190 ⌐(Sign Out)

Declaration of Independence

IN CONGRESS, July 4, 1776. ⌐110

The unanimous Declaration of the thirteen united States of America,

When in the Course of human events, it becomes necessary for one people to dissolve the political bands which have connected them with another, and to assume among the powers of the earth, the separate and equal station to ␣␣␣ the Laws of Nature and of Nature's God entitle them, a decent respect to the opinions of mankind requires 229 ey should declare the causes which impel them to the separation. ⌐228 ⌐226
We hold these truths to be self-evident, t222 men are created equal, that they are endowed by their Creator with certain unalienable Rights, that among these are ~~Life, Liberty and the pursuit of Happiness~~.--That to secure these rights, Governments are instituted among Men, deriving their just p/w ␣ ɔm the consen the— 195 governed, --That whenever any Form of Government becomes destructive 223 e ends, it is the right of the People to alter or to abolish it, and to institute new Government, laying its fc ion on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by ⌐112 abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

130   IN CONGRESS. July 4, 1776.

214

Please select text
you would want
to highlight for the
recepient(s). ⌐ 215

⌐ 220
[Done]  [Cancel]

The History Behind the Declaration of Independence
150

170⌐[Share ▶]   190⌐[Sign Out]

Declaration of Independence

IN CONGRESS, July 4, 1776. ⟵ 110

The unanimous Declaration of the thirteen united States of America,

When in the Course of human events, it becomes necessary for one people to dissolve the political bands which have connected them with another, and to assume among the powers of the earth, the separate and equal station to ⟵ 229 the Laws of Nature and of Nature's God entitle them, a decent respect to the opinions of mankind requires t229ey should declare the causes which impel them to the separation. ⟵ 228

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by ⟵ 112
abolishing the forms to which they are accustomed. But when a long train of abuses 130   In CONGRESS, July 4, 1776.
and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

*The History Behind the Declaration of*
150 *Independe*

Highlight Text ⟵ 280

Highlight Image ⟵ 281
⟵ 282
Identify A/V Segment
⟵ 285
170 ⟵ [ Share ▶ ]   Enter Recipient(s)   190 ⟵ [ Sign Out ]
⟵ 288
[ Post ] [ Cancel ]   ⟵ 275

Declaration of Independence

IN CONGRESS, July 4, 1776. ⟋ 110

The unanimous Declaration of the thirteen united States of America,

When in the Course of human events, it becomes necessary for one people to dissolve the political bands which have connected them with another, and to assume among the powers of the earth, the separate and equal station to ___ the Laws of Nature and of Nature's God entitle them, a decent respect to the opinions of mankind requires t229ey should declare the causes which impel them to the separation. — 228

We hold these truths to be self-evident, that all men are created equal, that they are endowed by their Creator with certain unalienable Rights, that among these are [Life, Liberty and the pursuit of Happiness]--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by ⟋ 112
abolishing the forms to which they are
accustomed. But when a long train of abuses

335

Please select the portions of the image you would want to highlight for the recepient(s). ⟋ 336
⟋ 337
[Done]  [Cancel]

130  IN CONGRESS, July 4, 1776.

Tyranny over these States. To prove this, let Facts be submitted to a candid world.

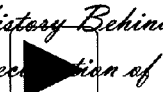

150  The History Behind the Declaration of Independence

170 ⟋ [Share ▶]   190 ⟋ [Sign Out]

Declaration of Independence

IN CONGRESS, July 4, 1776. ⌐110

The unanimous Declaration of the thirteen united States of America,

When in the Course of human events, it becomes necessary for one people to dissolve the political bands which have connected them with another, and to assume among the powers of the earth, the separate and equal station to 229 the Laws of Nature and of Nature's God entitle them, a decent respect to the opinions of mankind requires that they should declare the causes which impel them to the separation. ⌐ 228

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by abolishing the forms to which they are accustomed. But when a long train of abuses and usurpations, pursuing invariably the same Object evinces a design to reduce them under absolute Despotism, it is their right, it is their duty, to throw off such Government, and to provide new Guards for their future security.--Such has been the patient sufferance of these Colonies; and such is now the necessity which constrains them to alter their former Systems of Government. The history of the present King of Great Britain is a history of repeated injuries and usurpations, all having in direct object the establishment of an absolute Tyranny over these States. To prove this, let Facts be submitted to a candid world.

⌐112

130   In CONGRESS. July 4, 1776.

The unanimous Declaration  344 States of America.

*The History Behind the Declaration of Independence*

150

Highlight Text ⌐ 280
Highlight Image ⌐ 281
⌐ 282
[ Identify A/V Segment ]
⌐ 285
170 ⌐ [ Share ▶ ]   Enter Recipient(s)   190 ⌐ [ Sign Out ]
⌐ 288
[ Post ]   [ Cancel ]
⌐ 275

FIG. 4A

SHARING ONLINE WITH GRANULARITY

BACKGROUND

Sometimes sharing content online can be tedious for the sharer and/or confusing for the recipient. For example, if Alice wants to share a webpage with Bob, Alice would share the uniform resource locator (URL) of that webpage or the webpage itself with Bob.

If Alice wants Bob to pay attention to a specific part of that webpage, Alice would need to describe the specific part and hope that Bob would be able to manually locate the specific part. For example, Alice would need to say "Look at the third sentence of the sixth paragraph," or "see the lower left side of the second image," or "the funny part is between minutes 2 to 4 of the video at the end of the page," or "I think you will appreciate the segment between minutes 15 and 17 of the audio."

Some webpages are long and/or packed with similar content. Even if Alice spends time and effort in describing the specific part of a webpage, Bob may not be able to locate it.

SUMMARY

The subject matter discussed herein relates generally to data processing and, more particularly, to sharing online with granularity.

The subject matter discussed herein provides one or more advantages. One advantage is providing the sharer or poster of content the ability to identify and/or highlight specific portions of the content to draw the attention of the recipients of the content, which can be any content in any medium. Another advantage is freeing the recipients from having to navigate and look for the specific portions of the content the sharer wants to share.

The subject matter includes at least a computing device, a computer product, and a method for providing content for presenting to a user; receiving input from the user indicating identification of a portion of the content; associating with another user a notice of availability of the content; receiving a request from the another user, the request identifies the content; and providing the content for presenting to the another user, such that at least a part of the portion of the content is positioned for presenting without navigation input from the another user.

In some implementations, the content includes text, the portion of the content includes a portion of the text, and the portion of the content is identified by a visual indicator.

In some implementations, a portion of the text is at least a part of a predetermined portion.

In some implementations, the content includes an image, the portion of the content includes a portion of the image, and the portion of the content is identified by a visual indicator.

In some implementations, the content is presented in a zoomed-in presentation to the user or the another user.

In some implementations, the content includes a video, the portion of the content includes a duration of the video, the portion of the content is identified by identifying at least a starting point, and the portion of the content is positioned so that the video is played to the another user starting at the starting point.

In some implementations, the content includes an audio, the portion of the content includes a duration of the audio, the portion of the content is identified by identifying at least a point in playback time, and the portion of the content is positioned so that the audio is played to the another user starting at the point in playback time.

BRIEF DESCRIPTION OF THE DRAWINGS

FIG. 1 shows an example online presentation of content.
FIGS. 2A-C show example features for sharing text.
FIGS. 3A-C show example features for sharing an image.
FIGS. 4A-B show example features for sharing audio and/or video.

DETAILED DESCRIPTION

Figure 4B:
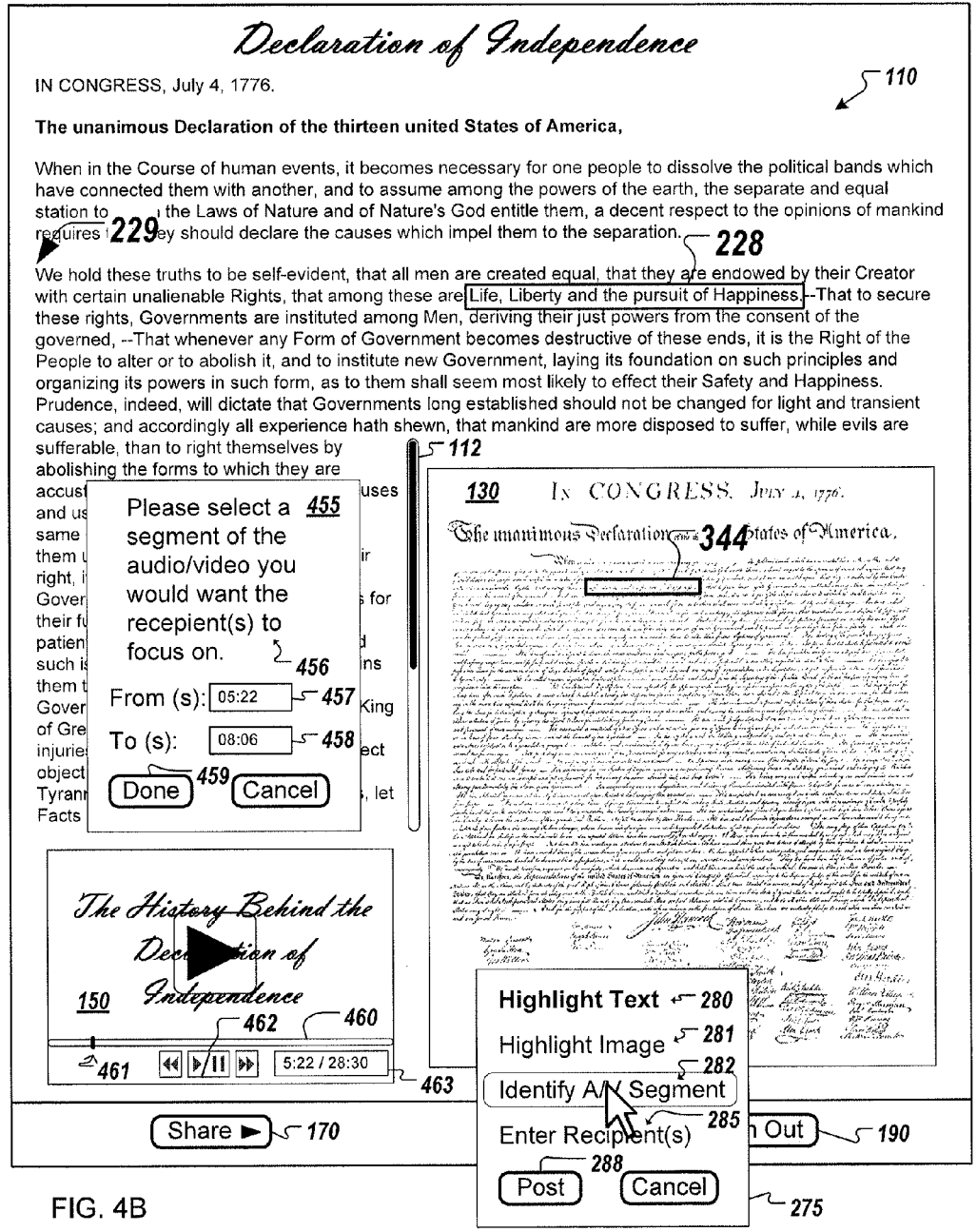

The subject matter described herein is taught by way of example implementations. Various details have been omitted for the sake of clarity and to avoid obscuring the subject matter. The examples shown below are directed to structures and functions for implementing sharing online with granularity.

FIG. 1 shows an example online presentation of content. As an example, the content may be presented on a webpage 100. Webpage 100 may be used to present content, such as text 110, one or more images 130, and/or one or more audio and/or video 150. Webpage 100 may include navigation widgets, such as a scrollbar 112 for scrolling Text 110. One or more user input widgets, such as buttons 170 and 190 may be provided. Webpage 100 may be viewed by a user (e.g., Alice) after logging into her social network account. A "Share" button 170 may be provided for Alice to share the webpage or a part thereof with other users on the social network. A "Sign Out" button 190 may be provided for Alice to sign out of her social network account. In some implementations, webpage 100 may provide different, more, or fewer user interface (UI) widgets and/or elements.

Content may be presented in any manner using any standard, protocol, and/or format, or a combination thereof. Webpage 100 is only one example content used herein to illustrate various example implementation features. Any digital content in any medium or combination of media may be shared. Some content may be presented in one or more markup languages, such as Standard Generalized Markup Language (SGML), Hypertext Markup Language (HTML), Extensible Markup Language (XML), Extensible Hypertext Markup Language (XHTML), Synchronized Multimedia Integration Language (SMIL), Mathematical Markup Language (MathML), and another markup language.

Some content may be presented in one or more standards, such as the Portable Document Format (PDF) standard. Some content may be presented in other formats, such as Joint Photographic Experts Group (JPEG) for image, and Moving Picture Experts Group (MPEG) for video and audio. JPEG and MPEG are only examples. Other formats and/or standards for presenting images, audios, and/or videos may be used.

Content may be presented using a combination of standards, protocols, and/or formats. For example, a webpage may include text in HTML, an image in JPEG format, one or more audios and/or videos in MPEG formats, a document in PDF format, and JavaScript code.

When Alice wants to share webpage 100 or a part thereof with one or more users on the social network, Alice may click on the "Share" button 170 using, for example, pointer 195.

For illustration, Alice comes across the phrase "Life, Liberty and the pursuit of Happiness" in the Declaration of Independence of the United States and is pleasantly surprised. Alice wants to share her pleasant surprise with her recipients (e.g., Bob and other users) on a social network. She wants to post the text of the Declaration of Independence (e.g., text 110), an image of the original Declaration of Independence (e.g., image 130), and a documentary video (e.g., video 150) on the history behind the Declaration of Independence.

The phrase "Life, Liberty and the pursuit of Happiness" is not easy to locate and her recipients may not be able to find it. Alice wants to make sure that her recipients see the phrase in text 110 and in image 130. Alice also wants her recipients to view a segment of video 150 that discusses "Life, Liberty and the pursuit of Happiness."

FIG. 2A shows example features for sharing text. Webpage 200A is shown with menu 275 being presented to Alice (e.g., after pressing the "Share" button 170). Menu 275 may include options 280-282, a mechanism 285 for Alice to enter recipient information (e.g., one or more users and/or circles with whom to share the content shown in webpage 200A), and a "Post" button 288. Alice may enter the recipient information any time before posting by pressing or activating the "Enter Recipient(s)" option 285. A window or input box (not shown) may be provided to allow Alice to input one or more users and/or circles as recipients.

Menu 275 is illustrated with a "Highlight Text" option 280, a "Highlight Image" option 281, and an "Identify A/V Segment" option 282. In some implementations, menu 275 may be a static menu, including all the possible options 280-282 and other widgets 285-288. Options 280-282 may be included regardless of the content presented on webpage 200A.

The "Highlight Text" option 280 may be used to identify, select, or highlight one or more portions of text, e.g., to call the attention of the recipients on the highlighted text when viewing webpage 200A. The "Highlight Image" option 281 may be used to identify, select, or highlight one or more portions of an image, e.g., to call the attention of the recipients to the highlighted portions when viewing webpage 200A. The "Identify A/V Segment" option 282 may be used to identify, select, or highlight one or more segments of an audio or video, e.g., to start playing the audio or video from the identified segment when the recipients view webpage 200A.

In some implementations, menu 275 may be a context sensitive menu that includes useful options and does not include options that are not applicable based on the context of webpage 200A. For example, if webpage 200A includes text and a video but does not present any image, menu 275 will include the "Highlight Text" option 280 and "Identify A/V Segment" option 282, but will not include the "Highlight Image" option 281.

Here, the "Identify A/V Segment" option 282 can be used with respect to an audio and a video. In some implementations, options for selecting or identifying a segment of an audio or a video may be presented as separate options (not shown).

In the example of FIG. 2A, Alice may choose the "Highlight Text" option 280 to initiate selection or identification of one or more portions of the text she wants to draw to the attention of her recipients.

FIG. 2B shows an example of identifying, selecting, or highlight one or more portions of text 110. Webpage 200B shows that a UI widget 214 may be provided, for example, after the "Highlight Text" option 280 is activated. UI widget 214, shown here as a pop-up menu, may include an instruction 215 and other UI elements (e.g., a button 220).

In some implementations, text may be selected based on predetermined units, such as paragraphs or sentences. For example, when the "Highlight Text" option 280 is activated, sentences within text 110 may be identified automatically and indicated, such as with checkboxes 216. The user (e.g., Alice) can select one or more sentences to highlight by checking the corresponding checkboxes.

For illustration, to highlight the phase "Life, Liberty and the pursuit of Happiness," Alice places a check mark 217 (e.g., using a mouse pointer) at the checkbox next to the sentence that includes the phase. Check mark 217 has identified the portion 218 of the text 110, and the portion may be shown with a different background color (e.g., a highlight). If Alice wants to highlight additional text, Alice can place check marks in other checkboxes 216 near the text she wants to highlight.

FIG. 2C shows another example of identifying, selecting, or highlighting a portion of text content. In this example, Alice may identify, select, or highlight portions of text in a free form. For example, Alice may position pointer 195 at point 222, click and drag the pointer 195 along the path 223 to the point 226 to identify portion 228. Portion 228 may be highlighted (e.g., shown with visual indication, such as with a different background color or a wireframe outline, not shown). For example, in HTML, portion 228 may be provided as "<font color='yellow'>Life, Liberty and the pursuit of Happiness</font>" or using a style sheet (e.g., a cascade style sheet). Point 229 shows the beginning of the sentence that includes the identified or highlighted portion 228.

Alice may proceed to identify another portion of text. When Alice is done highlighting one or more portions of the text 110, Alice may click on the "Done" 220 button, and return to, for example, the menu 275 shown in FIG. 2A.

Figure 3C:
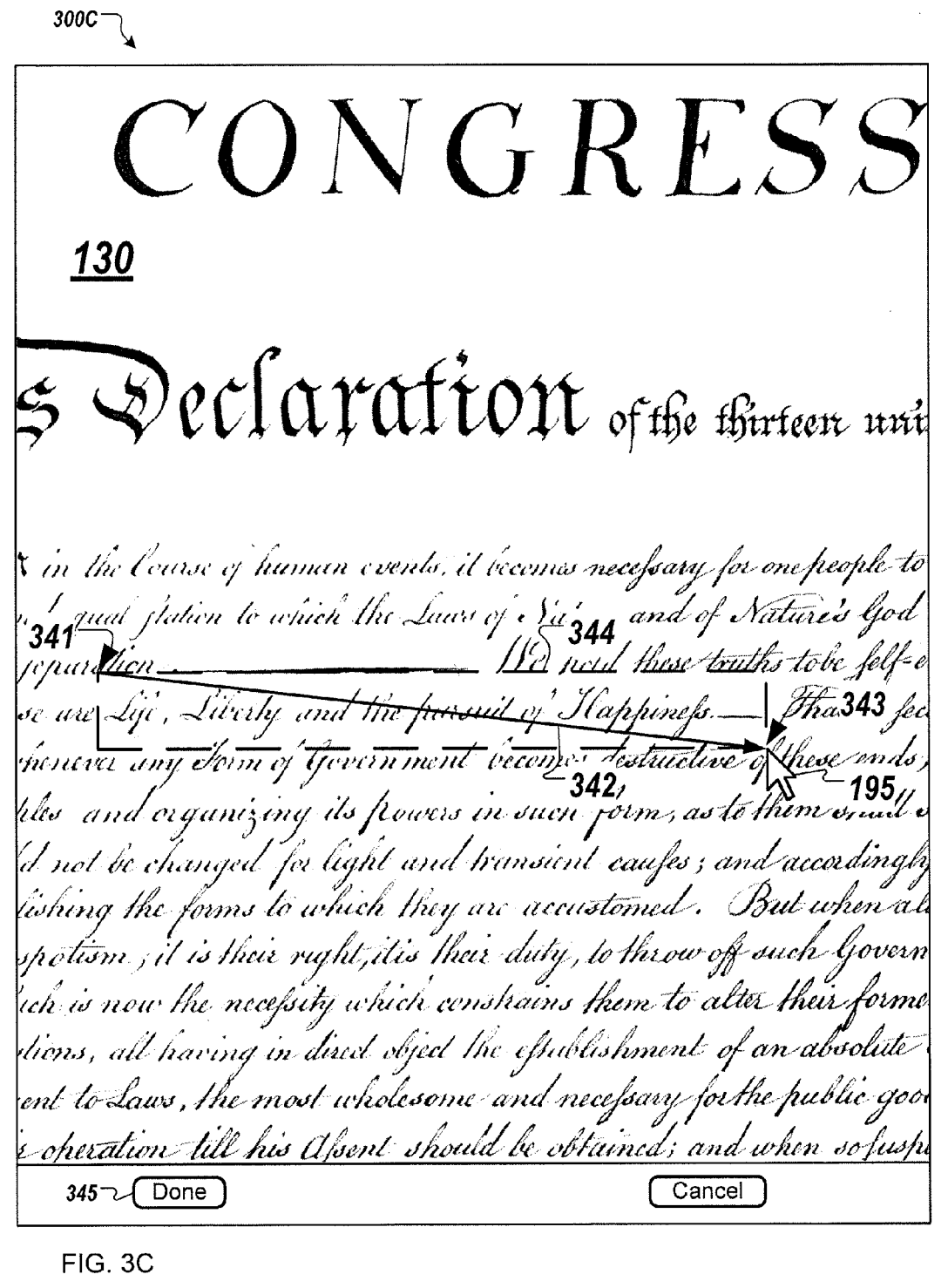

FIGS. 2A-2C are only examples of selecting, identifying, and/or highlighting text portions. Other implementation examples are possible but are not shown. For example, a portion of text 110 may be selected, identified, and/or highlighted by using paragraph boundaries, using whitespace (e.g., line breaks) as portion boundaries, etc. In some implementations, one or more portions of text 100 may be selected, identified, and/or highlighted geometrically, such as defining, identifying, and/or highlighting the background of a shape (e.g., circle, oval, rectangle, square, etc.) near the portions of text to which the user wishes to draw the attention of the recipients. An example of identifying a geometrical area is described below with respect to FIG. 3C.

After one or more portions of text 110 have been identified or selected, the portions or information about the portions may be stored. In some implementations, the webpage (e.g., 200B or 200C) may be stored with the portions (e.g., storing the webpage with the portion marked on the webpage). For example, in HTML, the page may be stored with changes that include HTML codes for highlight the portions (e.g., portion 228 may be embedded as "<font color='yellow'>Life, Liberty and the pursuit of Happiness</font>").

FIG. 3A shows an example of initiating selection or identification of one or more portions of an image. In this example, Alice may choose the "Highlight Image" option 281.

FIG. 3B shows an example of identifying, selecting, or highlighting one or more portions of an image. Webpage 300B shows that a UI widget 335 may be provided, for example, after the "Highlight Image" option 281 is activated. UI widget 335, shown here as a pop-up menu, may include an instruction 336 and other UI elements (e.g., a button 337). Alice may identify, select, or highlight one or more portions of image 130 as shown or after zooming out or in of image 130. For example, Alice may position pointer 195 over any part of image 130, click or double-click on image 130 to zoom in.

FIG. 3C shows a zoomed-in view of image 130 in a window 300C. In some implementations, the zoomed-in view of image 130 may be shown in place on webpage 300B. In this example, Alice may have positioned navigated image 130 to review a general area (e.g., upper-center area) in which she wants to highlight a portion. Alice may identify, select, or highlight a portion of image 130 by positioning pointer 195 at point 341, clicking and dragging the pointer 195 along the path 342 to the point 343 to identify portion 344. Portion 344 may be identified by changing image 130 (e.g., adding an outline of the portion or changing the color in the portion).

In some implementations, portion 344 may be identified by recording the position and size of the portion relative to image 130. For example, image 130 may be zoomed in 10 times to 8000×12000 pixels and portion 344 may be 2000×500 pixels. Point 341 may be at (x,y)=(3000,2000) and point 343 may be at (5000,2500). When image 130 is zoomed out (e.g., returned to 800×1200 pixels), portion 344 is reduce to 200×50 pixels. Point 341 is then at (x,y)=(300,200) and point 343 at (500,250).

Information about portion 344 (e.g., the x,y coordinates of points 341 and 343 and/or the size of portion 344) may be stored or saved. In some implementations, the webpage (e.g., 300A or 300B) may be stored with the portions (e.g., storing the webpage with image 130 and portion 344 marked on the image). For example, in a JPEG image, pixel information of the portions may be changed to show an outline frame and/or color change.

Portion 344 may be highlighted (e.g., shown with a different color and/or with a wireframe outline). Alice may then proceed to highlight another portion (not shown) if so desired. When Alice is done highlighting one or more portions, Alice may click on the "Done" 345 button, and return to, for example, webpage 300B, FIG. 3B. After identifying portion 344, webpage 300B is shown as example webpage 400A in FIG. 4A.

FIG. 4A shows an example of initiating selection or identification of a portion or segment of an audio or video. In this example, Alice may choose the "Identify A/V Segment" option 282.

FIG. 4B shows an example of identifying, selecting, or highlighting a portion or segment of an audio or video. Webpage 400B shows that a UI widget 455 may be provided, for example, after the "Identify A/V Segment" option 282 is activated. UI widget 455, shown here as a pop-up menu, may include an instruction 456, boxes that show the start time 457 and end time 458 of the selected segment, and other UI elements (e.g., a button 459). In some implementations, start time 457 and end time 458 may have one or two default values (e.g., "0:00", not shown). The audio or video (e.g., video 150) may be shown with a play bar 460, a play position indicator 461, one or more play control buttons 462, and a play status box 463. Play status box 463 may show, in some implementations, the current play position over the duration of the audio or video (e.g., expressed in time).

Alice may identify, select, or highlight a segment of an audio or video (e.g., video 150) by identifying the beginning of the segment (e.g., starting time) and the length or ending of the segment (e.g., ending time). In some implementations, the length or ending time of the segment does not need to be identified.

Any way or manner of identifying the segment can be implemented. For example, Alice may enter the start time 457 and end time 458 manually (e.g., "05:22" and "08:06" in the format of "minute:second"). Alice may scrub the play position indicator 461 (e.g., position a control pointer on the play position indicator 461, click on it to control or "hold" on to it, then drag it) to a desire starting time (e.g., "5:22"), which may be shown in play status box 463 (e.g., "5:22/28:30"). Alice may press a play/pause button 462 to run the video 150 to the desired starting time (e.g., "5:22"), then press the play/pause button 462 again to stop the playing of video 150. To identify the end time length of the segment, Alice may, for example, press a key on a keyboard (e.g., a "CTRL" key) while scrubbing the play position indicator 461 to a desire end time (e.g., "8:06). In some implementations, the starting and ending time may be shown in start time 457 and end time 458.

Information about the segment (e.g., the start time 457 and end time 458) portion may be stored or saved.

After Alice has entered recipient information and identified, selected, and/or highlighted one or more portions of text 110, one or more portions of image 130, and/or one or more segment of an audio or video (e.g., video 150), Alice may post webpage 400B for sharing with her provided recipients (e.g., activating the "Post" button 288).

Figure 5:
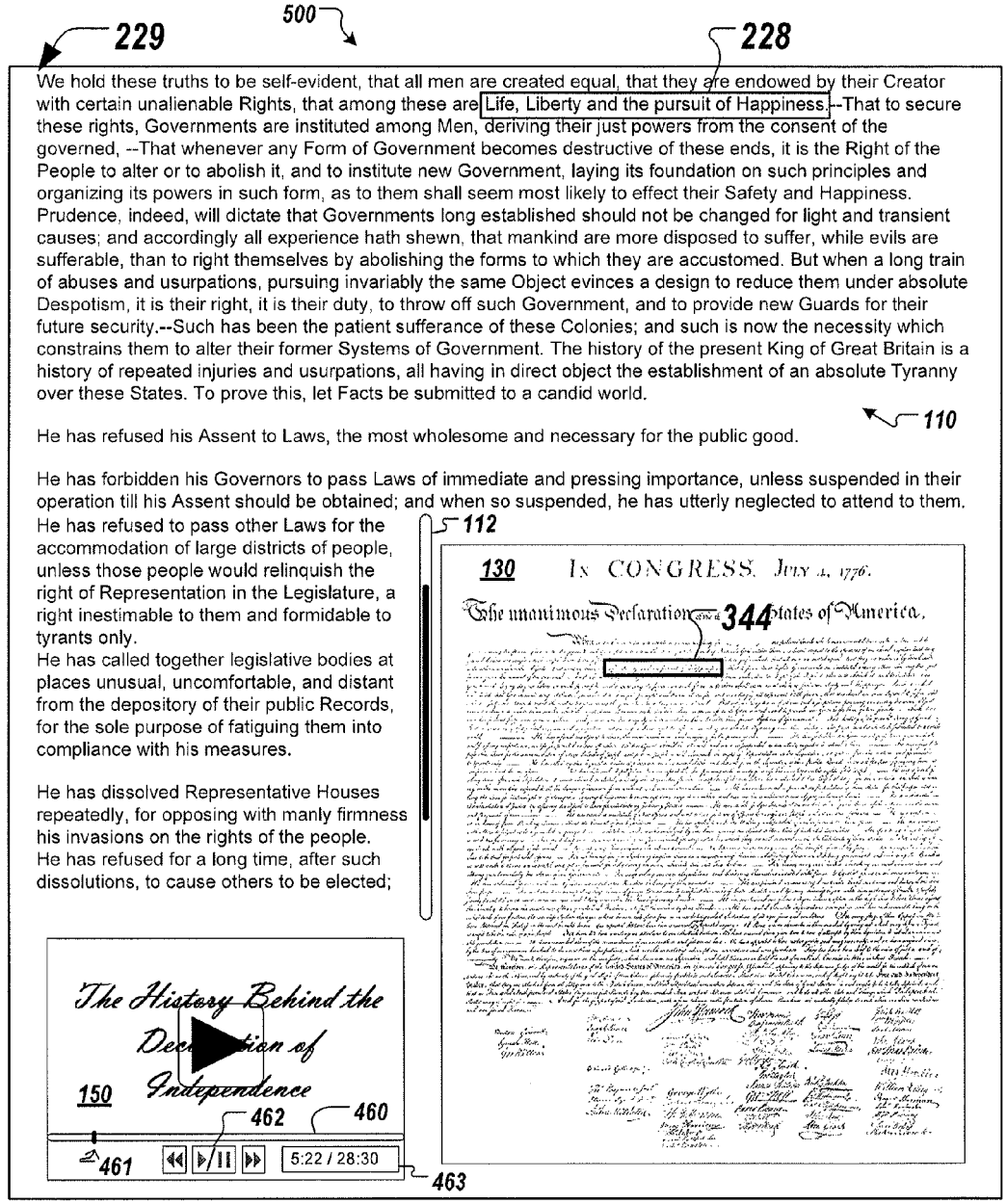
FIG. 5 shows example content presented to a recipient.

FIG. 5 shows example content presented to a recipient. The example content may be a combination of text 110, image 130, and video 150 presented in a webpage 500 (e.g., on a social network). Text 110 may have one or more identified and/or highlighted portions (e.g., portion 228). In some implementations, when text 110 includes one or more highlighted portions, the first highlighted portion may be positioned for presenting to the recipient without intervention or navigation by the recipient.

For example, webpage 500 may be visited using a URL of "webpage500." Inside webpage 500, a navigation script (e.g., a script in JavaScript, or an HTML anchor tag, etc.) may be added automatically to identify point 229 of the page (e.g., "<a name='topOFpage'></a>"). In some examples, when the recipient visits webpage 500, the "topOFpage" position may be automatically navigated to (e.g., using JavaScript). The URL presented for the recipient to click on may be "webpage500" or "webpage500#topOFpage." Clicking on "webpage500" will lead to webpage 500 being loaded and positioned such that point 229 is at the top of the page. The effect is the same or similar to clicking on "webpage500#topOFpage."

If webpage 500 includes an image (e.g., image 130) with a portion (e.g., portion 344) identified by the sharer (e.g., Alice), the portion is highlighted and/or identified for the recipient. If image 130 has been changed to include portion 344, portion 344 will be shown as part of image 130. In some examples, portion 344 may be kept or stored separately from image 130. To identify portion 344, information about portion 344 (e.g., the x,y coordinates of points 341 and 343 and/or the size of portion 344) may be provided along with webpage 500. A web browser may then use the information about portion 344 to draw an outline and/or superimpose a color over an area defined between points 341 and 343 or a size of the portion.

If webpage 500 includes one or more audio and/or video (e.g., video 150), the starting position of video 150 may be automatically advanced (e.g., when the recipient starts playing video 150, it starts playing from the starting position). Example script for setting a starting position of a media file (e.g., video or audio) in a webpage is provide below:

```
<OBJECT id="VIDEO150"
type="application/x-oleobject">
<PARAM NAME="URL" VALUE="video150.wmv">
<PARAM NAME="SendPlayStateChangeEvents" VALUE="True">
<PARAM NAME="AutoStart" VALUE="True">
</OBJECT>
<script language="javascript">
// set the position in seconds, 5:22 = 322 seconds
VIDEO.controls.currentPosition = 322;
</script>
```

Here, when a recipient requests webpage 500 (e.g., on a social network), the recipient sees the page automatically loaded and positioned to show text 110 with a text portion 228 automatically positioned in view (e.g., point 229 being positioned to the top of the page). If the webpage includes an image with a portion identified by the sharer, the image is shown with the portion (e.g., portion 344 of image 130) highlighted and/or outlined. If the webpage includes an audio or video with a segment identified by the sharer, the audio or video is provided and presented ready to play starting with the segment. When the recipient plays the audio or video (e.g., clicks on play on video 150), it will start playing the identified segment, skipping any segment before the identified segment. For example, video 150 will start playing from the point that is five minutes twenty-two seconds from the beginning of the video.

Figure 6:
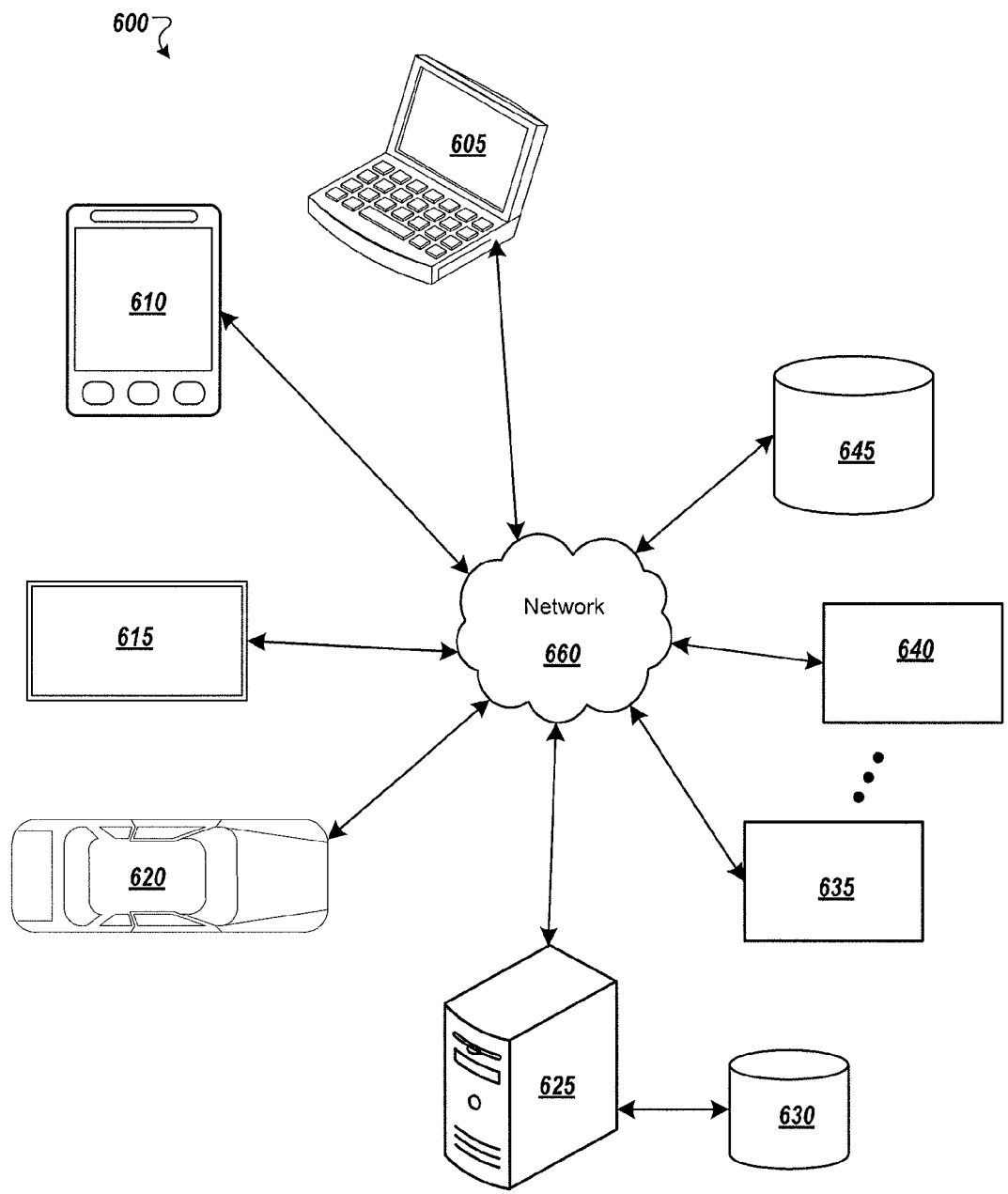
FIG. 6 shows an example online environment suitable for some example implementations.

FIG. 6 shows an example online environment suitable for some example implementations. Environment 600 includes devices 605-645, and each is communicatively connected to at least one other device via, for example, network 660 (e.g., by wired and/or wireless connections). Some devices may be communicatively connected to one or more storage devices 630 and 645.

An example of one or more devices 605-645 may be computing device 805 described below in FIG. 8. Devices 605-645 may include, but are not limited to, a computer 605 (e.g., a laptop computing device), a mobile device 610 (e.g., smartphone or tablet), a television 615 with one or more processors embedded therein and/or coupled thereto, a device associated with a vehicle 620, a server computer 625, computing devices 635-640, storage devices 630 and 645.

In some implementations, devices 605-620 may be considered user devices (e.g., devices used by users to access services and/or issue requests, such as on a social network). Devices 625-645 may be devices associated with service providers (e.g., used by service providers to provide services and/or store data, such as webpages, text, text portions, images, image portions, audios, audio segments, videos, video segments, and/or information thereabout).

For example, a user (e.g., Alice) may access, view, and/or share content or a webpage using user device 605 or 610 on a social network supported by one or more devices 625-645. A recipient (e.g., Bob) may access and/or view Alice's shared content using device 615 or 620.

Figure 7:
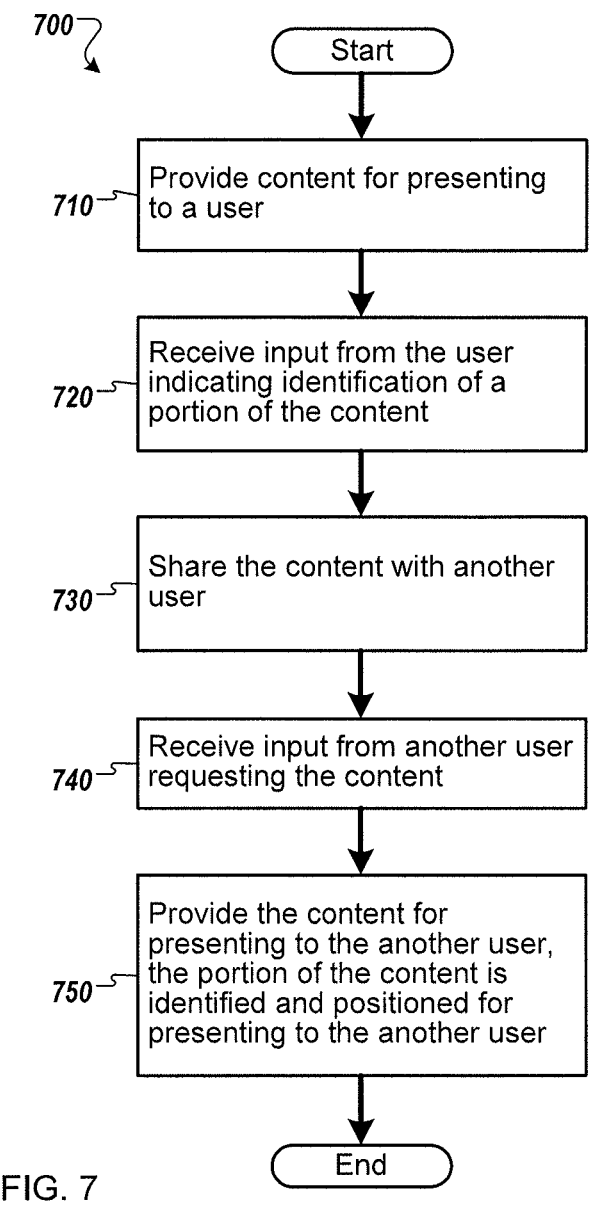
FIG. 7 shows an example of a process implementation.

FIG. 7 shows an example of a process implementation. Process 700 may start by providing content for presenting to a user (e.g., on a website) at block 710. For example, webpage 100, FIG. 1, may be provided for presenting to Alice. At block 720, input from Alice may be received indicating identification of a portion of the content (e.g., portion 218, FIG. 2B, portion 228, FIG. 2C, portion 344, FIG. 3C, or segment start time 457, FIG. 4B). In some implementations, information about the content and/or the portion of the content may be stored. In other implementations, the content and/or the portion of the content may be stored.

In some implementations, the identification of a portion may cause the content to be shared (e.g., posted on a social network) automatically. In other implementations, Alice may confirm sharing or posting of the content (e.g., clicking on a "Post" button 288, FIG. 4B) at block 730. A notice of availability of the content may be provided, notified, or otherwise associated with one or more recipients (e.g., Bob) of the content. For example, on Bob's social account, a notice is provided that indicates there is a share content from Alice. When Bob logs in to his social network account, he sees that notice. At block 740, Bob requests the content shared by Alice. For example, Bob may click on a button or link that indicates the availability of Alice's shared content.

At block 750, webpage 500, FIG. 5, may be provided e.g., by a web server on device 625, FIG. 6, to device 615, FIG. 6, for presenting to Bob. Without any navigation input from Bob (e.g., Bob does not have to scroll text 110), the portion of the content (e.g., portion 228) is identified with highlight, a box, and/or other visual indicator and the portion is positioned for presenting to Bob (e.g., positioning text 110 so that point 229 is at the top of the page) on the website of the social network or on another website (e.g., a website of another service provider, such as an email service provider).

In some examples, process 700 may be implemented with different, fewer, or more blocks. Process 700 may be implemented as computer executable instructions, which can be stored on a medium, loaded onto one or more processors of one or more computing devices, and executed as a computer-implemented method.

Figure 8:
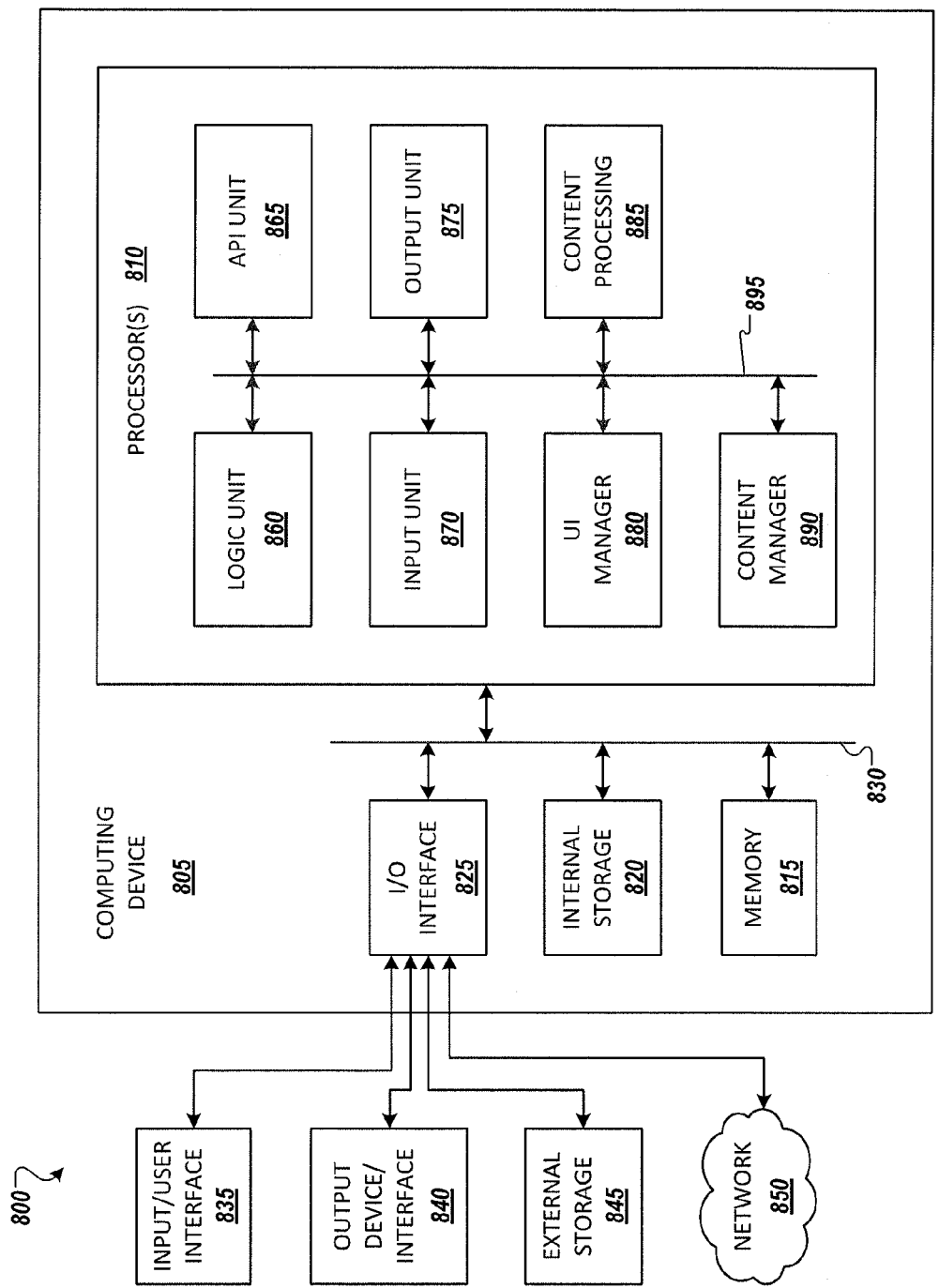
FIG. 8 shows an example computing environment with an example computing device suitable for use in some example implementations.

FIG. 8 shows an example computing environment with an example computing device suitable for use in some example implementations. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example implementations, input/user interface 835 and output device/interface 840 can be embedded with or physically coupled to the computing device 805. In other example implementations, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. One or more applications can be deployed that include logic unit 860, application programming interface (API) unit 865, input unit 870, output unit 875, UI manager 880, content processing unit 885, content manager 890, and inter-unit communication mechanism 895 for the different units to communicate with each other, with the OS, and with other applications (not shown). For example, UI manager 880, content processing unit 885, and content manager 890 may implement one or more processes shown in FIG. 7. The described units and elements can be varied in design, function, configuration, or implementation and are not limited to the descriptions provided.

In some example implementations, when information or an execution instruction is received by API unit 865, it may be communicated to one or more other units (e.g., logic unit 860, input unit 870, output unit 875, UI manager 880, content processing unit 885, and content manager 890). For example, output unit 875 may present to Alice a webpage arranged by UI manager 880. Alice's input identifying one or more portions may be received by input unit 870, which may pass to content processing unit 885 via API unit 865.

Content manager 890 may be called upon to store the content with the portions or information about the content with the portions, or any combination thereof. Content manager 890 may provide a notification of availability of the content to a recipient (e.g., Bob).

Bob's input requesting the content may be received by input unit 870, which may pass to UI manager 880 via API unit 865. UI manager 880 in conjunction with content manager 890 may present to Bob a webpage the content shared by Alice with the portions identified and/or highlighted. One or more portions may be positioned for presenting without further navigation input from Bob.

In some instances, logic unit 860 may be configured to control the information flow among the units and direct the services provided by API unit 865, input unit 870, output unit 875, UI manager 880, content processing unit 885, and content manager 890 in some example implementations described above. For example, the flow of one or more processes or implementations may be controlled by logic unit 860 alone or in conjunction with API unit 865.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
providing, by a processor, content for presenting to a user;
receiving an input from the user, the input representing a visual identification of a portion of the content based on an annotation, wherein the visual identification of the portion comprises at least a starting point of the portion, wherein the visual identification is received via a user interface widget that receives the annotation, wherein the user identifies, via the user interface widget, a recipient of the annotation and one or more context-sensitive options that are provided based on the content provided by the processor;

associating, with the recipient identified by the user interface widget, a notice of availability of the content;
receiving a request from the recipient that identifies the content without identifying the portion of the content and without identifying the annotation;
in response to the request from the recipient and the recipient being associated with the notice of availability, providing the content for presenting to the recipient, such that the portion of the content is identified within the content and a part of the portion of the content is visually identified within the content by a visual indicator provided by the user interface, and a location of the portion provided and positioned via the user interface, for presenting to the recipient without requiring navigation input by the recipient, wherein the content comprises a video or an audio, and the visual identification of the portion of the content comprises a play interface positioned at the starting point of the portion of the content, based on a user determination of the starting point as provided to the user interface widget, so that the video or audio is automatically advanced to the recipient identified by the user interface widget, starting at the starting point of the portion of the content, and is played, while visually identifying the portion of the content within the content; and
wherein the context-sensitive options comprise a first option to identify an audiovisual segment and a second option to identify the recipient.

2. The method of claim 1, wherein the content comprises text, and the visual identification of the portion of the content comprises a portion of the text being identified by the visual indicator.

3. The method of claim 2, wherein a portion of the text is at least a part of a predetermined portion.

4. The method of claim 1, wherein the content comprises an image, and the visual identification of the portion of the content comprises a portion of the image being identified by the visual indicator.

5. The method of claim 4, wherein the content is presented in a zoomed-in presentation to the recipient.

6. The method of claim 1, wherein the visual identification of the portion of the content comprises a visual display of a duration of the audio or video comprises a numerical value as the starting point.

7. The method of claim 1, wherein a device and an account associated with the user is different from another device and another account associated with the recipient, and the user is not the recipient.

8. A non-transitory computer readable medium having stored therein computer executable instructions for:
providing content for presenting to a user;
receiving an input from the user indicating identification of a portion of the content based on an annotation, wherein the visual identification of the portion comprises at least a starting point of the portion, wherein the visual identification is received via a user interface widget that receives the annotation, wherein the user identifies, via the user interface widget, a recipient of the annotation and one or more context-sensitive options that are provided based on the content provided by the processor;
associating, with the recipient identified by the user interface widget, a notice of availability of the content;
receiving a request from the recipient that identifies the content without identifying the portion of the content and without identifying the annotation;
in response to the request from the recipient and the recipient being associated with the notice of availability, providing the content for presenting to the recipient, such that the portion of the content is identified within the content and a part of the portion of the content is visually identified within the content by a visual indicator provided by the user interface widget, and a location of the portion provided and positioned via the user interface widget, for presenting to the recipient without requiring navigation input by the recipient, wherein the content comprises a video or an audio, and the visual identification of the portion of the content comprises a play interface positioned at the starting point of the portion of the content, based on a user determination of the starting point as provided to the user interface widget, so that the video or audio is automatically advanced to the recipient identified by the user interface widget, starting at the starting point of the portion of the content, and content before the starting point is skipped, while visually identifying the portion of the content within the content, without requiring navigation input from the recipient; and
wherein the context-sensitive options comprise a first option to identify an audiovisual segment and a second option to identify the recipient.

9. The computer readable medium of claim 8, wherein the content comprises text, the portion of the content comprises a portion of the text, and the portion of the content is identified by the visual indicator.

10. The computer readable medium of claim 9, wherein a portion of the text is at least a part of a predetermined portion.

11. The computer readable medium of claim 8, wherein the content comprises an image, the portion of the content comprises a portion of the image, and the portion of the content is identified by the visual indicator.

12. The computer readable medium of claim 11, wherein the content is presented in a zoomed-in presentation to the recipient.

13. The computer readable medium of claim 8, wherein the portion of the content comprises a duration of the video that is not a full duration of the video, and the portion of the content is positioned so that the video is played to the recipient starting at the starting point without requiring the navigation input from the recipient.

14. The computer readable medium of claim 8, wherein the content comprises the audio, the portion of the content comprises the duration of the audio, the portion of the content is identified by identifying at least a point in playback time, based on a user determination of the point as provided to the user interface widget, and the portion of the content is positioned so that the audio is played to the recipient starting at the point in playback time without requiring the navigation input from the recipient.

15. At least one computing device comprising storage and a processor configured to perform:
providing content for presenting to a user;
receiving an input from the user indicating identification of a portion of the content based on an annotation, wherein the visual identification of the portion comprises at least a starting point of the portion, wherein the visual identification is received via a user interface widget that receives the annotation, wherein the user identifies, via the user interface widget, a recipient of the annotation and one or more context-sensitive options that are provided based on the content provided by the processor;

associating, with the recipient identified by the user interface widget a notice of availability of the content;

receiving a request from the recipient that identifies the content without identifying the portion of the content and without identifying the annotation; and in response to the request from the recipient and the recipient being associated with the notice of availability, providing the content for presenting to the recipient, such that the portion of the content is identified within the content and a part of the portion of the content is visually identified within the content by a visual indicator provided by the user interface widget, and a location of the portion provided and positioned via the user interface widget, for presenting to the recipient without requiring navigation input by the recipient, wherein the content comprises a video or an audio, and the visual identification of the portion of the content comprises a play interface positioned at the starting point of the portion of the content, based on a user determination of the starting point as provided to the user interface widget, so that the video or audio is automatically advanced to the recipient identified by the user interface widget, starting at the starting point of the portion of the content and played, and content before the starting point is skipped, while visually identifying the portion of the content within the content, and without requiring navigation input from the recipient; and wherein the context-sensitive options comprise a first option to identify an audiovisual segment and a second option to identify the recipient.

16. The at least one computing device of claim 15, wherein the content comprises text, the portion of the content comprises a portion of the text, and the portion of the content is identified by the visual indicator.

17. The at least one computing device of claim 16, wherein a portion of the text is at least a part of a predetermined portion.

18. The at least one computing device of claim 15, wherein the content comprises an image, the portion of the content comprises a portion of the image, and the portion of the content is identified by the visual indicator.

19. The at least one computing device of claim 18, wherein the content is presented in a zoomed-in presentation to the recipient.

* * * * *